United States Patent
Winkler

(10) Patent No.: US 8,875,851 B2
(45) Date of Patent: Nov. 4, 2014

(54) ELECTROMECHANICAL VEHICLE BRAKE

(75) Inventor: Thomas Winkler, Mainz (DE)

(73) Assignee: Continental Teves AG & Co. oHG (DE)

( * ) Notice: Subject to any disclaimer, the term of this patent is extended or adjusted under 35 U.S.C. 154(b) by 110 days.

(21) Appl. No.: 13/262,004

(22) PCT Filed: Mar. 17, 2010

(86) PCT No.: PCT/EP2010/053434
§ 371 (c)(1),
(2), (4) Date: Sep. 29, 2011

(87) PCT Pub. No.: WO2010/112338
PCT Pub. Date: Oct. 7, 2010

(65) Prior Publication Data
US 2012/0018262 A1  Jan. 26, 2012

(30) Foreign Application Priority Data

Apr. 2, 2009  (DE) .................. 10 2009 015 514
May 2, 2009  (DE) .................. 10 2009 019 793

(51) Int. Cl.
*B60T 7/00* (2006.01)
*B60T 13/58* (2006.01)
(Continued)

(52) U.S. Cl.
CPC ............ *F16D 65/18* (2013.01); *F16H 25/2233* (2013.01); *F16D 2121/24* (2013.01); *F16D 2121/02* (2013.01); *F16D 2123/00* (2013.01); *F16D 2125/40* (2013.01); *F16D 2125/52* (2013.01)
USPC ..... 188/106 F; 188/71.8; 188/72.8; 188/72.6; 188/196 V; 188/196 D; 74/89.23; 74/424.82

(58) Field of Classification Search
CPC . F16D 2121/02; F16D 2121/14; F16D 65/18; F16D 55/2245; F16H 49/00; F16H 25/06; F16H 25/2204; F16H 25/2214; F16H 25/2238; F16H 2025/2242; F16C 1/20; F16C 33/3706
USPC ........... 188/106 F, 72.6, 67; 74/216.3, 89.37, 74/89.38, 89.39, 89.26, 89.42, 89.45, 74/89.23
See application file for complete search history.

(56) References Cited

U.S. PATENT DOCUMENTS 1,905,039 A * 4/1933 McKellar ..................... 74/89.37
2,844,044 A * 7/1958 Cole .......................... 74/424.82
(Continued)

FOREIGN PATENT DOCUMENTS

DE         7640810 U1    7/1977
DE       10346080 A1    7/2004
(Continued)

OTHER PUBLICATIONS

German Search Report issued in related Application No. DE 10 2009 019 793.1 dated Aug. 2, 2010 (with partial English translation).
(Continued)

*Primary Examiner* — Anna Momper
*Assistant Examiner* — San Aung
(74) *Attorney, Agent, or Firm* — RatnerPrestia

(57) ABSTRACT

A combined electromechanical vehicle brake has a hydraulically activated operating brake and an electromechanically activated parking brake apparatus. A hydraulic operating pressure chamber in a brake housing is delimited by a brake piston that can be loaded by hydraulic pressure to carry out operating braking actions. The brake piston can be activated along a longitudinal piston axis to achieve a braking effect. The parking brake apparatus acts upon the brake piston by a gear unit because the gear unit converts the rotational movement of an electromechanical actuator into a translational movement, causing the brake piston to be activated to carry out parking brake processes and remain in the activated position. The gear unit has a threaded spindle and a threaded nut that contact one another via a plurality of rolling elements. A spring element allows the rolling elements to slip when the gear unit is activated in the unloaded state.

8 Claims, 3 Drawing Sheets

(51) Int. Cl.
  *F16D 65/14*   (2006.01)
  *F16H 25/22*   (2006.01)
  *F16D 65/18*   (2006.01)
  *F16D 121/24*   (2012.01)
  *F16D 121/02*   (2012.01)
  *F16D 123/00*   (2012.01)
  *F16D 125/40*   (2012.01)
  *F16D 125/52*   (2012.01)

(56) References Cited

U.S. PATENT DOCUMENTS

| 2005/0247149 | A1 | 11/2005 | Osterlanger | |
|---|---|---|---|---|
| 2007/0227280 | A1* | 10/2007 | Chen | 74/89.42 |
| 2008/0110284 | A1* | 5/2008 | Pan et al. | 74/89.23 |
| 2008/0110285 | A1* | 5/2008 | Pan et al. | 74/424.86 |
| 2009/0283371 | A1* | 11/2009 | Winkler et al. | 188/72.6 |
| 2011/0162935 | A1 | 7/2011 | Winkler | |

FOREIGN PATENT DOCUMENTS

| DE | 10150803 | B4 | 8/2006 |
|---|---|---|---|
| DE | 102007046180 | A1 | 5/2008 |
| DE | 102008051350 | A1 | 4/2009 |

OTHER PUBLICATIONS

International Search Report issued in PCT/EP2010/053434 filed Mar. 17, 2010, mailed May 19, 2010.

* cited by examiner

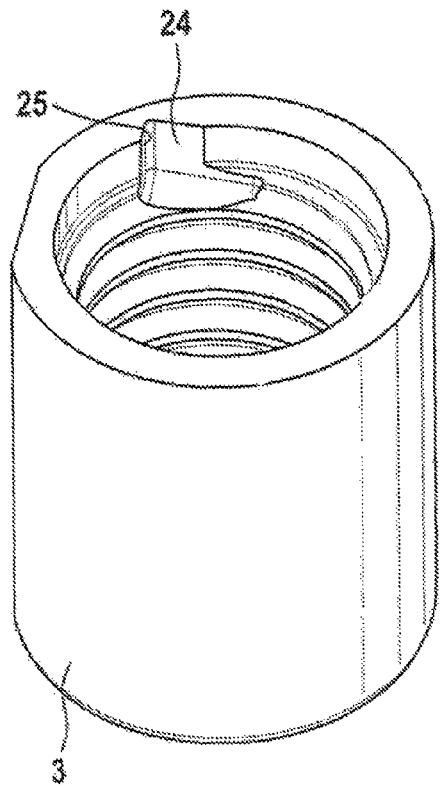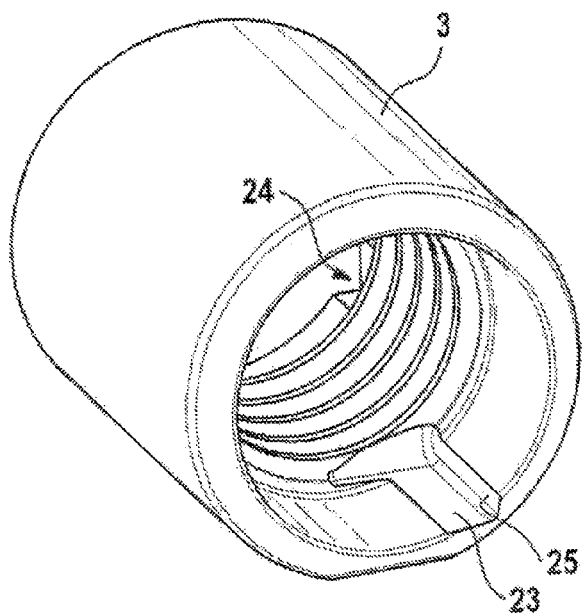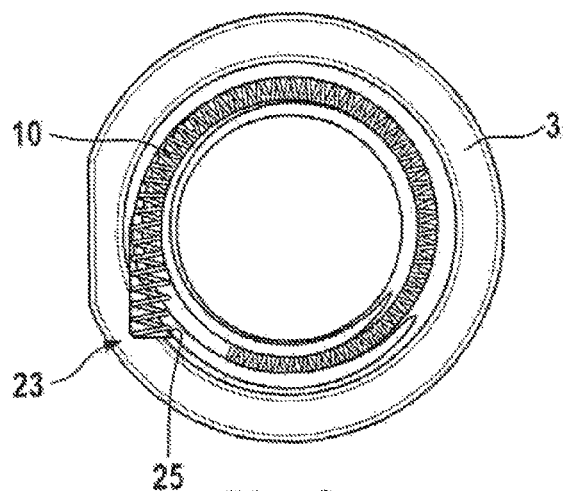

ELECTROMECHANICAL VEHICLE BRAKE

CROSS REFERENCE TO RELATED APPLICATIONS

This application is the U.S. National Phase Application of PCT/EP2010/053434, filed Mar. 17, 2010, which claims priority to German Patent Application No. 10 2009 015 514.7, filed Apr. 2, 2009, and German Patent Application No. 10 2009 019 793.1, filed May 2, 2009, the contents of such applications being incorporated by reference herein.

FIELD OF THE INVENTION

The present invention relates to an electromechanical, in particular combined, vehicle brake comprising a hydraulically actuatable service brake and an electromechanically actuatable parking brake device, wherein a hydraulic operating pressure chamber is delimited in a brake housing by a brake piston which can be loaded by hydraulic pressure medium in order to perform service braking operations, such that the brake piston can be actuated along a longitudinal piston axis in order to produce a braking effect, and wherein the parking brake device acts on the brake piston by means of a gear unit in that the gear unit converts the rotary motion of an electromechanical actuator into a translational motion, causing the brake piston to be actuated to perform parking brake operations and to remain in the actuated position, wherein the gear unit comprises a threaded spindle and a threaded nut which contact one another via a plurality of rolling elements, wherein there is provided a spring element which allows the rolling elements to slip when the gear unit is actuated in an unloaded state while causing the rolling elements to roll when the gear unit is actuated under load.

BACKGROUND OF THE INVENTION

A hydraulic vehicle brake with an electrically actuatable parking brake device is known, for example, from DE 101 50 803 B4, which is incorporated by reference. In the known vehicle brake there is provided a gear unit which converts the rotary motion of the electric motor into a longitudinal motion of the brake piston in order to produce a parking brake force, on the operating principle of a threaded nut/spindle arrangement. According to an exemplary embodiment, this gear unit is in the form of a so-called "spindle/recirculating ball sleeve arrangement", also referred to as a ball screw or recirculating ball spindle. These ball screws comprise a threaded spindle and a threaded nut which contact one another via a plurality of rolling elements.

A threaded nut having a rolling element arrangement without so-called ball recirculation is known from the German utility model DE 76 40 810 U, which is incorporated by reference. In this case the rolling elements have limited mobility between two stops rigidly connected to the threaded nut. A disadvantage of this arrangement is that the stops are inserted into the threaded nut from outside, as pins through a bore. Because the bore must meet the thread convolution precisely when drilling into the threaded nut from outside, production is difficult.

There are also brakes with purely electromechanical actuation (EMB) which are provided for brake-by-wire brake systems and which require a ball screw constructed identically in principle.

SUMMARY OF THE INVENTION

This invention relates to simplifying the production of a ball screw which is equally suitable for use in combined brakes and for use in brakes with purely electromechanical actuation.

According to one aspect of the invention, an electromechanical vehicle brake, preferably a combined brake comprising a hydraulically actuatable service brake and an electromechanically actuatable parking brake device, includes a hydraulic operating pressure chamber that is delimited in a brake housing by a brake piston which can be loaded by hydraulic pressure medium in order to perform service braking operations, such that the brake piston can be actuated hydraulically along a longitudinal piston axis (A) in order to produce a braking effect, and having an electromechanical actuation, in particular in the form of a parking brake device, which acts on the brake piston by means of a gear unit in that the gear unit converts the rotary motion of an electromechanical actuator into a translational motion, causing the brake piston to be actuated to perform parking brake processes and to remain in the actuated position, wherein the gear unit comprises a threaded spindle and a threaded nut which contact one another via a plurality of rolling elements, wherein there is provided a spring element which allows the rolling elements to slip when the gear unit is actuated in an unloaded state while causing the rolling elements to roll when the gear unit is actuated under load, wherein the spring element is arranged between the rolling elements and a pocket-shaped recess which is formed in the threaded nut and forms a stop for the spring element. In this case it is provided that the spring element is arranged between the rolling elements and a pocket-shaped recess which is formed in the threaded nut and provides a stop for the spring element. The stop for the spring element is therefore integrated in the threaded nut without an additional component, in that a pocket-shaped recess in which the spring element is supported is worked into the threaded nut.

In an especially advantageous development of the subject matter of the invention, the pocket-shaped recess continues tangentially, starting from the thread convolution of the threaded nut, and has a perpendicular stop face for the spring element against which the spring element bears.

A further advantageous development of the invention provides a second spring element which is arranged at the other end of the rolling elements between the rolling elements and a further pocket-shaped recess which is formed in the threaded nut and provides a stop for the second spring element. The second stop for the spring element is therefore also integrated in the threaded nut without an additional component, in that a pocket-shaped recess in which the spring element is supported is worked into the threaded nut. This pocket-shaped recess is configured as a recess arranged tangentially to the thread convolution of the threaded nut, with a perpendicular stop face for the spring element.

In the manufacturing process of the threaded nut it is provided that the pocket-shaped recesses are formed in the threaded nut using an impact process or a milling process.

BRIEF DESCRIPTION OF THE DRAWINGS

The invention is best understood from the following detailed description when read in connection with the accompanying drawings. Included in the drawings is the following figures:

FIGS. 2a to c show different representations of the threaded nut according to aspects of the invention.

DETAILED DESCRIPTION OF THE PREFERRED EMBODIMENTS

Figure 1:
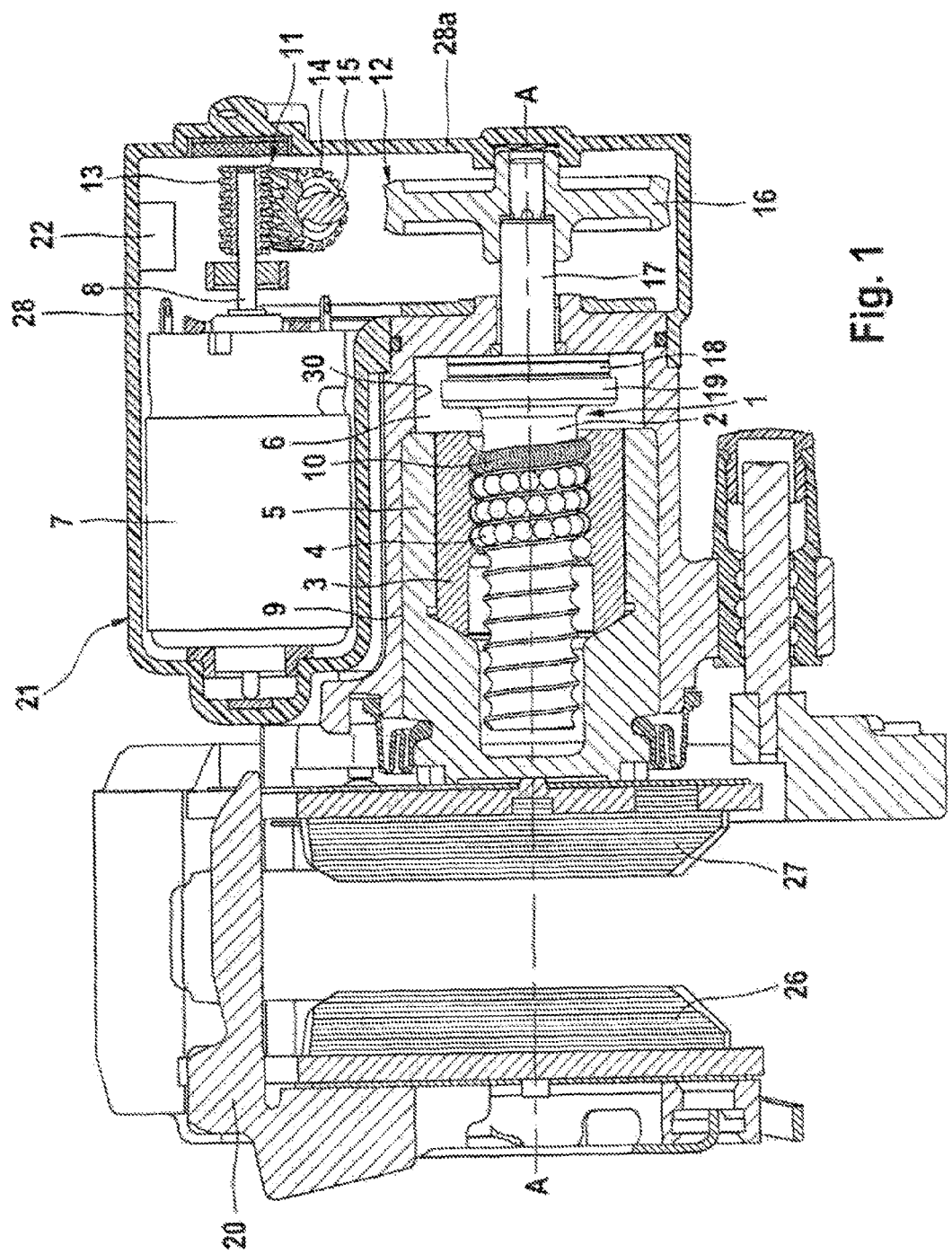
FIG. 1 is a sectional representation of a vehicle brake comprising a hydraulically actuatable service brake and an electromechanically actuatable parking brake.

The hydraulic vehicle brake represented in FIG. 1 comprises, on the one hand, a hydraulically actuatable service brake and, on the other, an electromechanically actuatable parking brake. In the example shown, the vehicle brake is in the form of a floating-caliper disk brake, the functioning of which, produced by hydraulic actuation, is well-known to the person skilled in the art, and for that reason does not need to be explained in more detail. An electromechanical actuator 7 or an electric motor 7, which is integrated in a drive module 21 together with a two-stage transmission, the necessary sensors and an electronic control unit 22, is used to actuate the parking brake. The abovementioned vehicle brake further comprises a brake housing or a brake caliper 20 which extends around the outer edge of a brake disk (not shown), and two brake pads 26, 27 arranged on each side of the brake disk. The brake housing 20 forms on its inner side a brake cylinder 9 which receives an axially displaceable brake piston 5. In order to execute service braking operations, brake fluid can be supplied to the operating pressure chamber 6 formed between brake cylinder 9 and brake piston 5 so as to build up a brake pressure, which displaces the brake piston 5 axially along a longitudinal piston axis A towards the brake disk. The brake pad 27 oriented towards the brake piston 5 is thereby pressed against the brake disk, the brake housing 20 being displaced by reaction in the opposite direction and thereby also pressing the other brake pad 26 against the brake disk.

As already mentioned, a parking brake device for carrying out parking brake processes is electromechanically actuatable and also acts on the brake piston 5. For this purpose there is provided a gear unit 1 which converts the rotary motion of the electromechanical actuator 7 or electric motor 7 into a translational motion, causing the brake piston 5 to be actuated along the axis A. The gear unit 1 is formed substantially by a threaded spindle 2 and a threaded nut 3 which are connected to one another via rolling elements 4. The rolling elements 4 are in the form of balls. A shaft 17 connected to the threaded spindle 2 projects from the brake housing 20 on the side oriented away from the brake disk and is driven by the aforementioned electromechanical actuator 7 via an interposed two-stage reduction gear. In this case means are provided for sealing the operating pressure chamber 6 in the bore of the brake housing 20, through which bore the shaft 17 projects. The rotary motion transmitted to the threaded spindle 2 is transmitted to the threaded nut 3 via the balls 4, which are located in the thread convolution between the threaded spindle 2 and the threaded nut 3, which threaded nut 3 performs a translational movement in the direction of the axis A. The brake piston 5, against which the threaded nut 3 bears, is thereby also actuated. At the same time the threaded spindle 2 is received by a stepped bore 30 in the brake housing 20 and bears against the brake housing 20 via a collar 19 connected to the spindle 2 and an axial bearing 18. The gear unit 1 thus converts the rotary motion of the electromechanical actuator 7 into a linear motion and is responsible for generating the application force for carrying out a parking brake process.

When the parking brake device is released the electric motor 7 is operated correspondingly in the opposite direction and the threaded nut 3, and therefore also the brake piston 5, perform a movement to the right in the drawing. The brake pads 26, 27 are no longer in contact with the brake disk and the parking brake process is ended.

The aforementioned electric motor 7 and the two-stage transmission are received by a housing 28 forming part of the drive module 21, which housing 28 can be sealed to a housing cover 28a. In the embodiment shown in FIG. 1, the two-stage transmission is in the form of a worm gear 11, 12. Worm gears are a category of rolling-contact worm gears in which, in contrast to rolling-contact gears, a sliding component is also present in the motion. Such a worm gear is constituted by a spiral-toothed gear wheel, a worm, and a helically toothed gear wheel, the worm wheel, which meshes therein.

The first transmission stage, that is, the first worm gear 11, is connected on the input side to the output shaft 8 of the electric motor 7, while the second transmission stage, that is the second worm gear 12, is connected on the output side to the shaft 17 and to the gear unit 1, or 2, 3. As illustrated, a first worm 13 is fitted to the output shaft 8 of the electric motor 7 and meshes with a first worm wheel 14. A second worm 15 is fitted to the center of rotation of the first worm wheel 14 and is set in rotation thereby. The second worm 15 in turn meshes with a second worm wheel 16, which is connected non-rotatably to the shaft 17 and sets in rotation the shaft 17 together with the gear unit 1, thereby generating a translational movement of the brake piston 5. So that the application force set in this way is maintained during a parking brake process, the second worm gear 12 is configured to be self-locking.

Upon actuation of the gear unit 1 under load, the rolling elements 4 roll in the thread convolution. A comparatively high efficiency of 85% to 95%, or of 75% to 85% allowing for the frictional losses in the axial bearing 18, is thereby achieved. Upon actuation of the gear unit 1 in the unloaded state, by contrast, the rolling elements 4 slip—that is, until the brake pad 27 associated with the brake piston 5 abuts the brake disk (not shown)—the balls 4 slip because a practically load-free actuation is involved here. The balls 4 begin to roll or run only under load. The gear unit 1 therefore acts at the same time as an adjustment if the brake pads 26, 27 are worn. The omission of a separate adjustment device, or the integration of adjustment device and actuation device in a single component, is especially cost-effective and at the same time robust. So that rolling of the rolling elements 4 under load and slipping thereof upon unloaded actuation of the gear unit 1 is always possible, a spring element 10, which makes available a rolling travel for the rolling elements 4, is provided. The rolling elements 4 are arranged in the thread convolution with limited mobility between two stops, the spring element 10 for making available a rolling travel for the rolling elements 4 being arranged between the rolling elements 4 and a first stop. The first stop is in the form of a pocket-shaped recess 23 and continues tangentially, starting from the thread convolution of the threaded nut 3. The pocket-shaped recess 23 ends in a perpendicular stop face 25, against which the spring element 10 bears, as illustrated, in particular, in FIGS. 2 and 3. A second spring element is arranged between the rolling elements 4 and the other stop, that is, the other pocket-shaped recess 24, and serves as a so-called buffer spring. This buffer spring bears against the second pocket-shaped recess 24.

As is apparent from FIGS. 2a to c, both stops are configured as pocket-shaped recesses 23, 24 in the threaded nut 3 and are therefore integrated in the threaded nut 3 without additional components. The pocket-shaped recesses 23, 24 are worked into the threaded nut 3 using an impact process or a milling process during the manufacture of the threaded nut 3.

Figure 3:
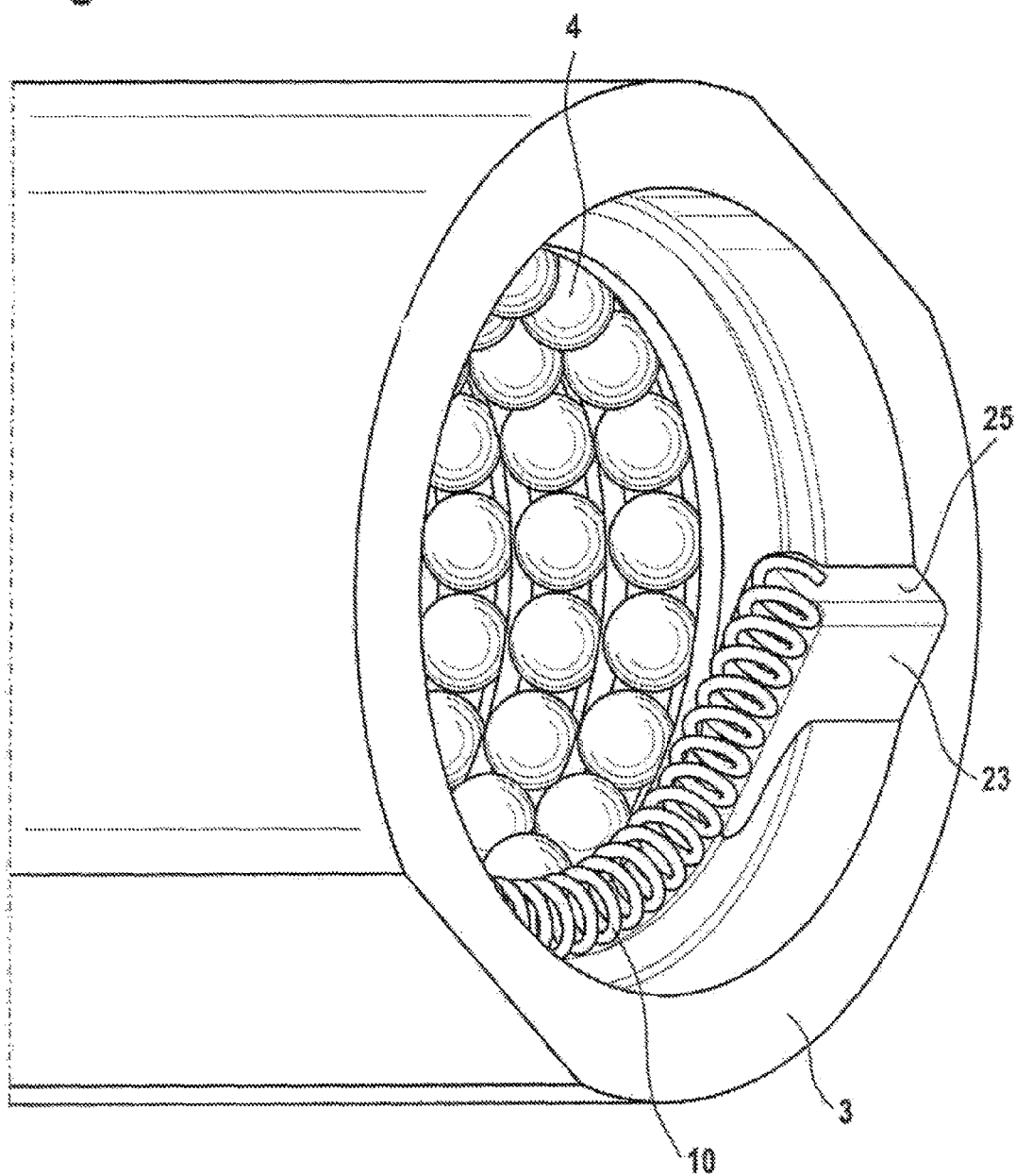
FIG. 3 is a three-dimensional representation of the threaded nut according to aspects of the invention.

As is clear from FIG. 3, the pocket-shaped recess 23—and likewise the pocket-shaped recess 24 at the other end of the threaded nut 3—are configured as recesses arranged tangentially to the thread convolution of the threaded nut 3, with a perpendicular stop face 25 for the spring element 10.

In the configuration described, it is advantageous that separate components for the stops are not required, the stops being integrated in the threaded nut 3 in a cost-effective manner.

Although the invention has been elucidated primarily using the example of a combined brake, in particular with reference to the drawing, applications in brake-by-wire brake devices with purely electromechanical actuation (EMB), which do not have any kind of hydraulic actuation device, are possible in principle.

LIST OF REFERENCES

1 Gear unit
2 Spindle or threaded spindle
3 Threaded nut
4 Rolling elements or balls
5 Brake piston
6 Hydraulic operating pressure chamber
7 Electromechanical actuator
8 Output shaft
9 Brake cylinder
10 First spring element
11 First worm gear
12 Second worm gear
13 First worm
14 First worm wheel
15 Second worm
16 Second worm wheel
17 Shaft
18 Axial bearing
19 Collar
20 Brake caliper
21 Drive module
22 Control unit
23 Recess
24 Recess
25 Stop face
26 Brake pad
27 Brake pad
28 Housing
28a Housing cover
29
30 Stepped bore

The invention claimed is:

1. An electromechanical vehicle brake comprising:
a hydraulic operating pressure chamber that is delimited in a brake housing by a brake piston which is configured to be loaded by hydraulic pressure medium in order to perform service braking operations, such that the brake piston is configured to be actuated hydraulically along a longitudinal piston axis (A) in order to produce a braking effect, and
an electromechanical actuator which acts on the brake piston by a gear unit, wherein the gear unit converts rotary motion of the electromechanical actuator into a translational motion, causing the brake piston to be actuated to perform parking brake processes and to remain in the actuated position, wherein the gear unit comprises a threaded spindle and a threaded nut which contact one another via a plurality of rolling elements,
a spring element that allows the rolling elements to slip when the gear unit is actuated in an unloaded state while causing the rolling elements to roll when the gear unit is actuated under load, wherein the spring element is arranged between the rolling elements and a pocket-shaped recess which is formed in the threaded nut and forms a stop for the spring element, one end of the spring element directly abutting against a stop face of the pocket-shaped recess defined by the threaded nut.

2. The electromechanical vehicle brake as claimed in claim 1, wherein the pocket-shaped recess, starting from a thread convolution of the threaded nut, is continued tangentially and has a perpendicular stop face for the spring element, against which the spring element bears.

3. The electromechanical vehicle brake as claimed in claim 2 further comprising a second spring element, which is arranged between the rolling elements and a further pocket-shaped recess which is formed in the threaded nut and forms a stop for the second spring element.

4. The electromechanical vehicle brake as claimed in claim 3, wherein the pocket-shaped recess is configured as a recess arranged tangentially to the thread convolution of the threaded nut, with a perpendicular stop face for the spring element.

5. The electromechanical vehicle brake as claimed in claim 3, wherein the pocket-shaped recesses are formed into the threaded nut using an impact process or a milling process.

6. The electromechanical vehicle brake as claimed in claim 1, wherein the electromechanical vehicle brake is a combined brake comprising a hydraulically actuatable service brake and an electromechanically actuatable parking brake device.

7. The electromechanical vehicle brake as claimed in claim 1, wherein the electromechanical actuation is in the form of a parking brake device.

8. The electromechanical vehicle brake as claim in claim 1, wherein the pocket-shaped recess is open in an axial direction of the threaded nut.

* * * * *